United States Patent [19]

Wright et al.

[11] Patent Number: 5,538,086
[45] Date of Patent: Jul. 23, 1996

[54] VARIABLE ORIENTATION ATTACHMENT IMPLEMENT

[76] Inventors: Rocky A. Wright, P.O. Box 1323; Doyle P. Gracey, P.O. Box 155, both of Tehachapi, Calif. 93581

[21] Appl. No.: 364,558

[22] Filed: Dec. 27, 1994

[51] Int. Cl.⁶ .......................... A01B 59/048; E02F 3/76
[52] U.S. Cl. ..................... 172/272; 172/273; 172/817
[58] Field of Search .................. 37/466, 467, 468; 172/272, 273, 274, 275, 815, 819; 414/723, 912

[56] References Cited

U.S. PATENT DOCUMENTS

| | | | |
|---|---|---|---|
| 3,432,184 | 3/1969 | Tweedy | 172/272 |
| 3,823,783 | 7/1974 | Luedtke | 172/802 |
| 3,853,335 | 12/1974 | Heikenkamp | 172/272 |
| 4,221,399 | 9/1980 | Berg | 172/272 |
| 4,333,250 | 6/1972 | Henderson | 172/272 X |
| 4,477,101 | 10/1984 | Nilsson et al. | 172/272 |
| 4,552,226 | 11/1985 | Platter | 172/815 |
| 4,919,212 | 4/1990 | McClure | 172/279 |
| 5,082,065 | 1/1992 | Fletcher | 172/273 |
| 5,165,191 | 11/1992 | Davis | 37/409 |

*Primary Examiner*—Terry Lee Melius
*Assistant Examiner*—Robert Pezzuto
*Attorney, Agent, or Firm*—Kenneth G. Pritchard

[57] ABSTRACT

An attachment implement for tractors or other vehicles permits the orientation of the desired attachment, such as a box scrapper, to be varied on tilt, pitch, height, and lateral angle. Variation of orientation of these four settings does not require a central attachment point.

11 Claims, 5 Drawing Sheets

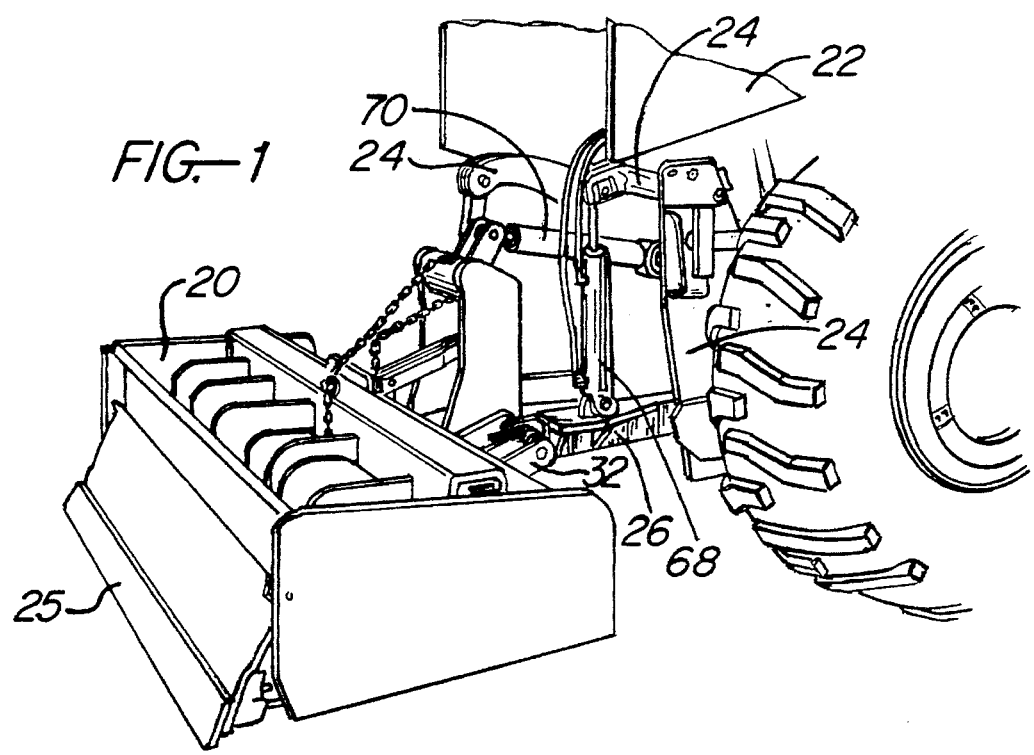
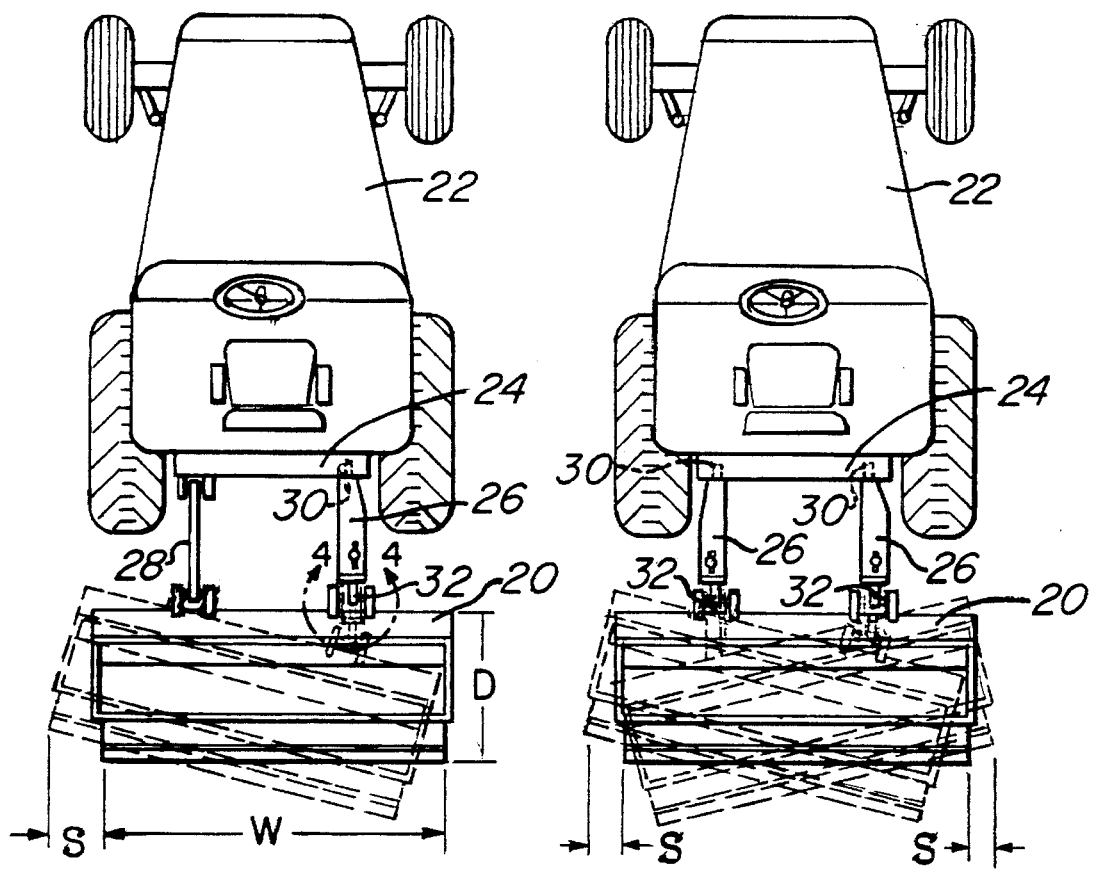

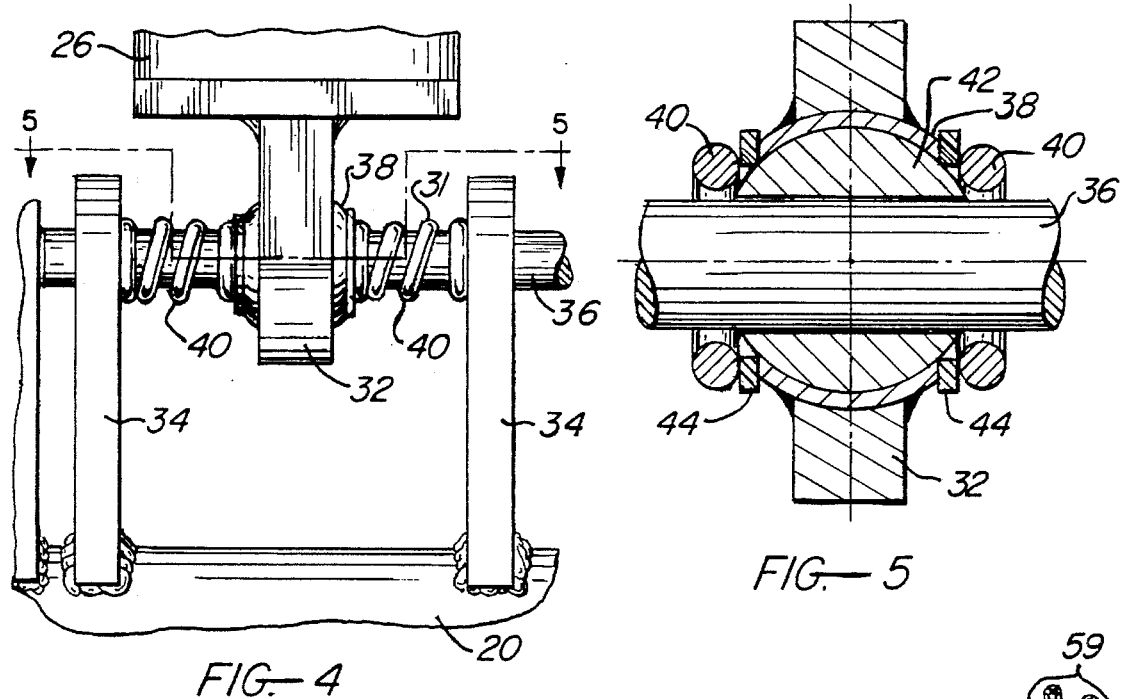
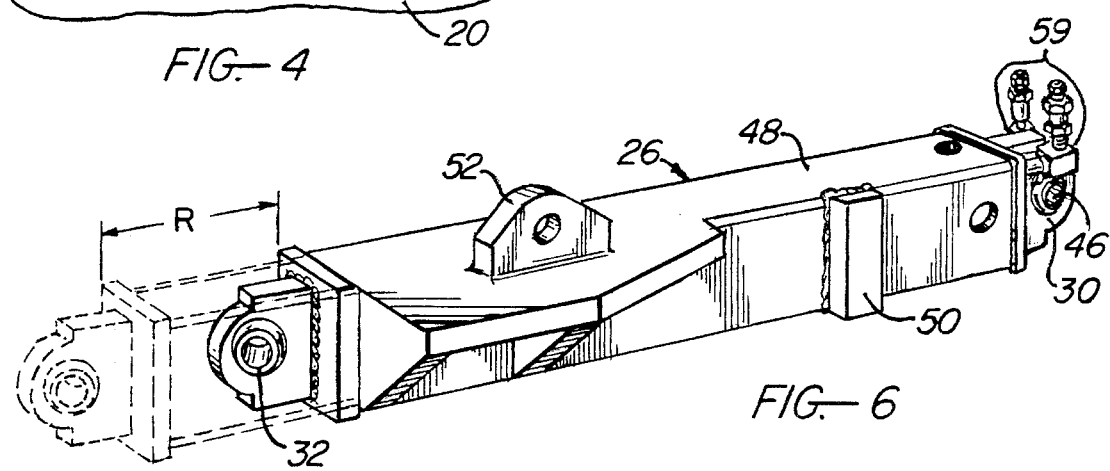
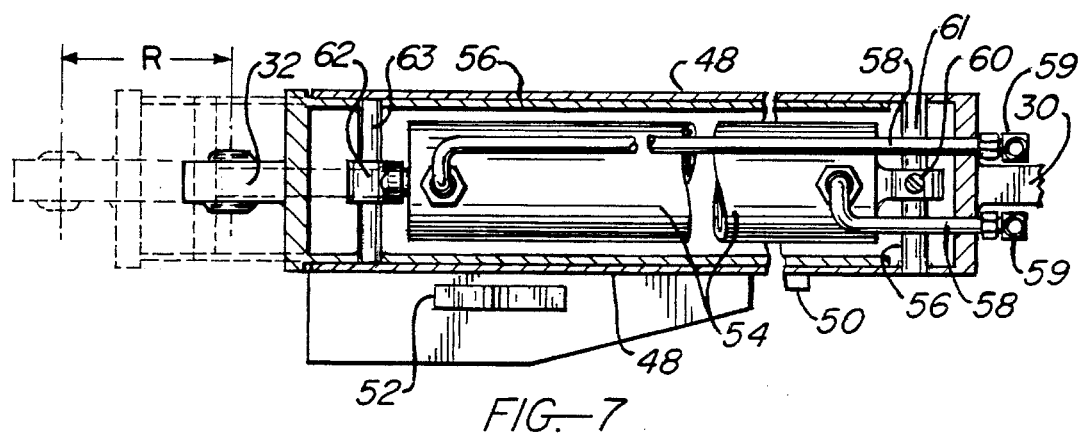

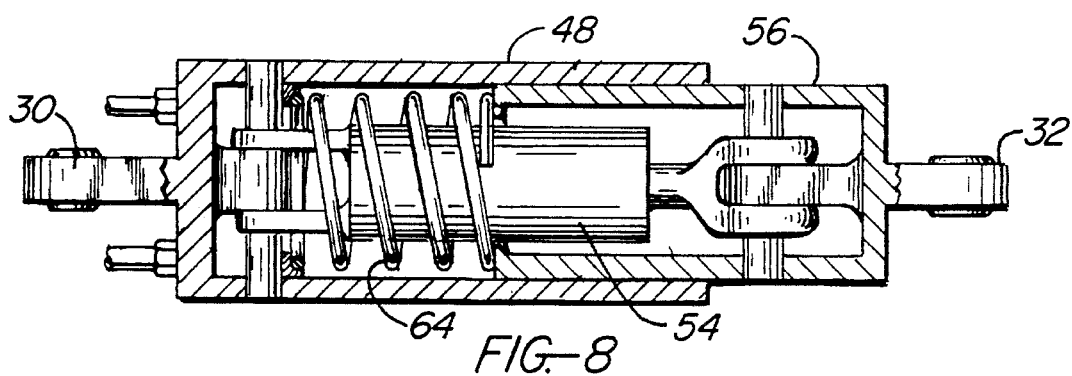
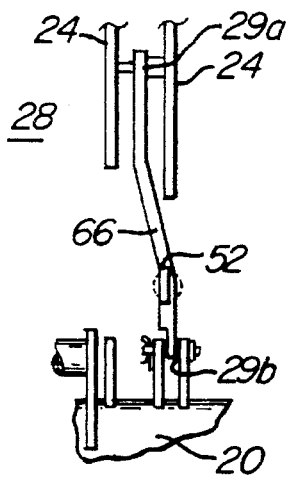
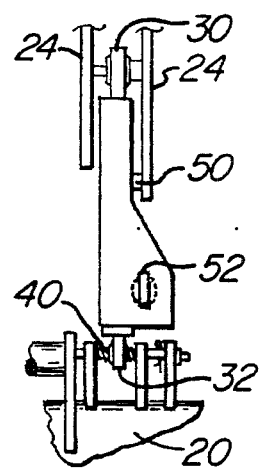
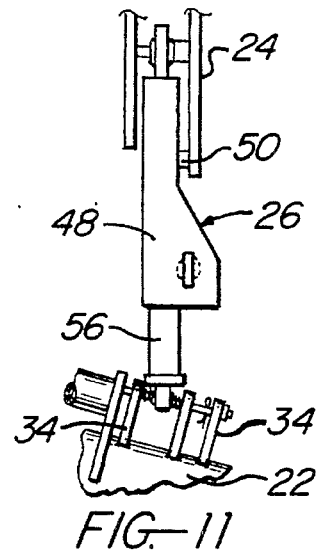
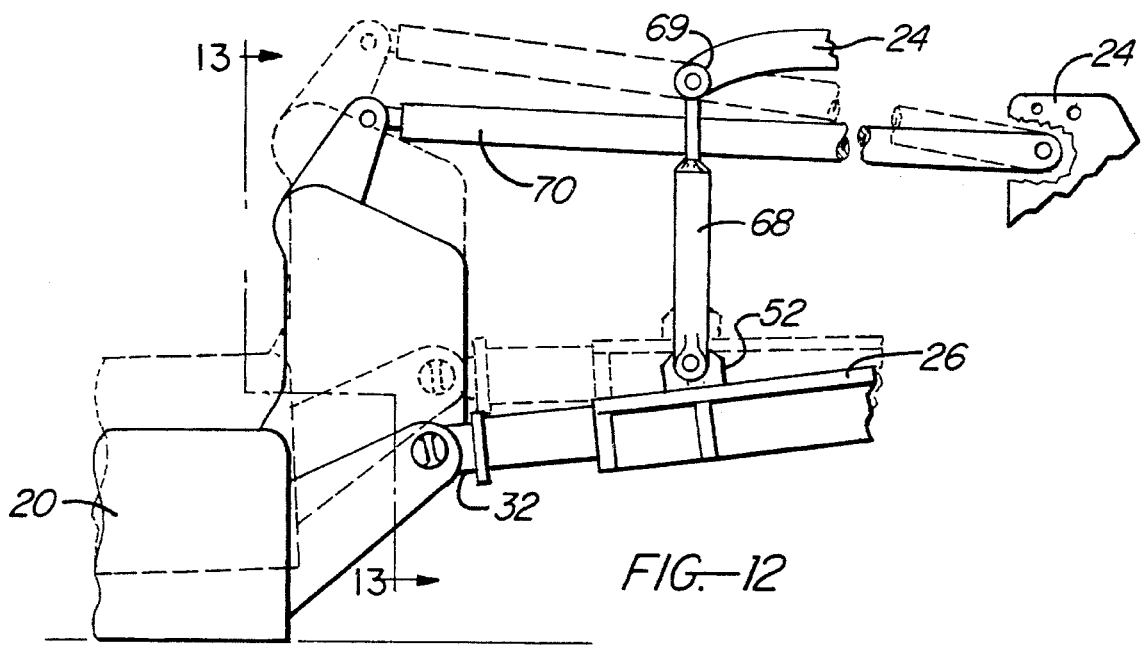

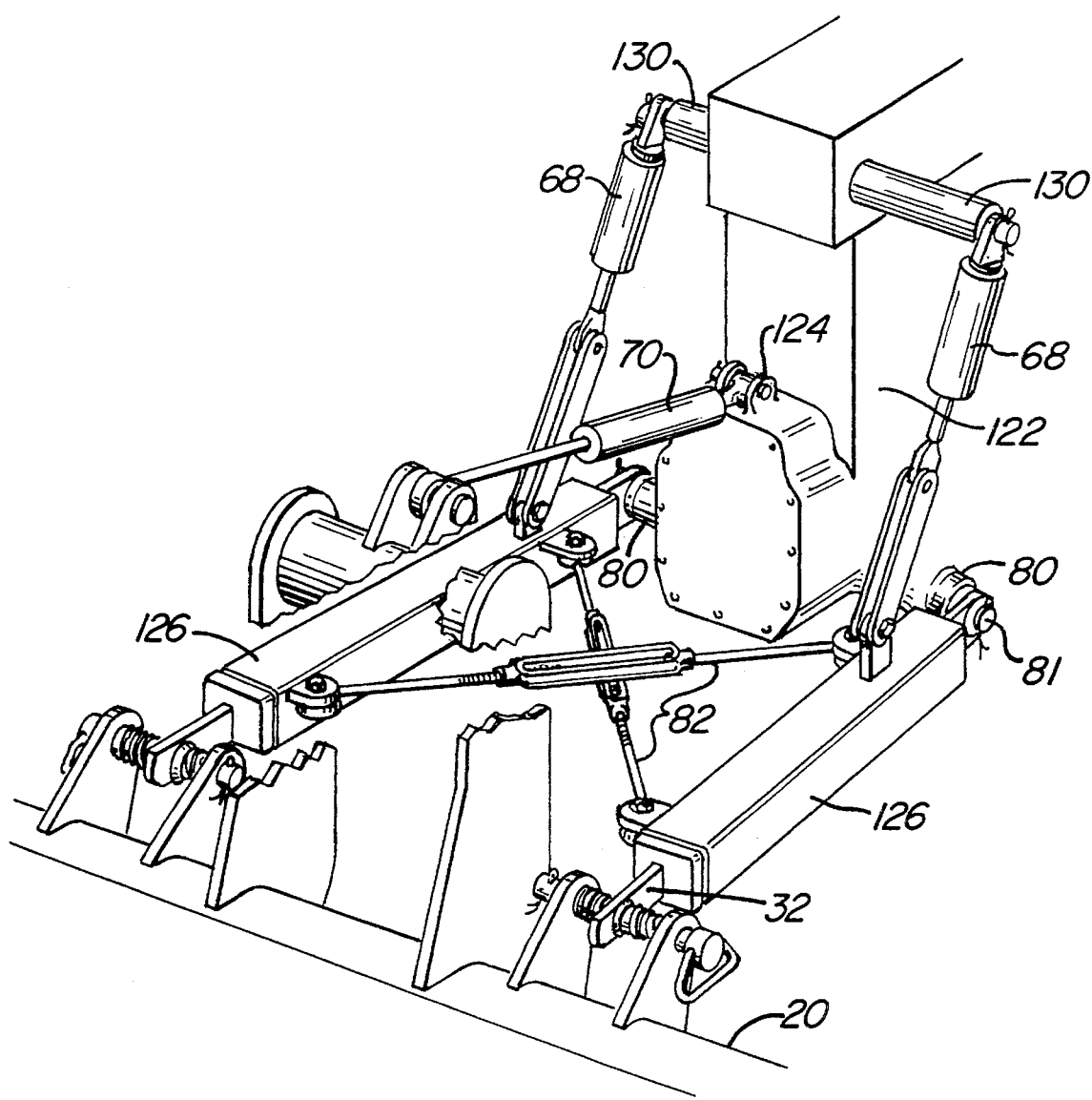
FIG.—14

VARIABLE ORIENTATION ATTACHMENT IMPLEMENT

BACKGROUND OF THE INVENTION

1. Field of the Invention

This invention relates to attachments to tractors or other vehicles. In greater particularity it relates to the use of attachments which permit a given implement to be moved in several ways including being displaced sideways without a centrally attached pivot point. In further detail, the invention can be mounted either as a front end or back end device.

2. Description of the Prior Art

The use of implements such as plows, buckets, boxes, and so forth on vehicles permit the moving of objects, such as dirt, faster and easier than direct human labor such as shoveling.

Prior art devices have consistently been limited to narrowly defined applications. Changing the tilt, pitch, height, and lateral angle are exceptionally useful applications for various tasks. The problem has been that different tasks have required changing implements. A variety of techniques have been tried to allow the attachment method to extend the range of uses of the implement. Tilt means one side of the implement is higher than the other side. Pitch refers to whether the implement leans forward or back. Height refers to how high the entire implement is picked up. Lateral angle refers to the twist of the implement.

By way of example, a snow plow will be used as an example of an implement. Height controls whether the plow is on the ground or above. Lateral angle is usually fixed at other than 90° to the direction of movement so the snow slides to one side of the road as the vehicle goes forward. Pitch is usually a design feature of the plow so that it slopes back near the road surface and then curves over to prevent rising snow from going over the top of the plow. Tilt is usually fixed at 0° to the level because the plow does not desire digging into the road surface. As can be readily seen, for different implements the criteria for each of these settings may vary.

A significant problem for changing the lateral angle is that if the implement is moveable, it is difficult to assure a return to a set position, such as perpendicular to the movement of the vehicle.

Prior art devices have been structurally limited because the movement areas must bear the bulk of the weight of the implement and can be easily damaged while in use.

Prior art devices also rely on a central attachment point and rely on this location to define movement, load and so forth. Because of pivoting about a central point, as this point wears it is difficult to guarantee the implement, such as a blade, can be set perpendicular to the direction of the vehicle.

Techniques are know which allow some displacement about the central attachment point. This technique makes such side shift one sided and the entire vehicle with attachments must turn around and travel the opposite direction if the shift is required to the opposite side. Side shift is highly useful as approaches along buildings, for example, have to deal with awnings, eaves and so forth which extend from the building. A common result is that there are areas where removal by hand labor is still required for a large variety of tasks.

The structural mounting to vehicles has depended on the frame construction of the vehicle to be used. Some vehicles have frames that may be used to attach implements by bolting or welding. Some vehicles, some tractor styles for example, only offer an anchor post. While an anchor post may be ideal for a towing hitch, it does cause problems for devices requiring support at two or more locations. Chains have been used to cross-link in such cases, but while chains prevent points from pulling apart, chains sag if compression is presented.

SUMMARY OF THE PRESENT INVENTION

Accordingly, one important object of the present invention is to provide an attachment device that permits a given implement, such as a box scrapper or bucket, to be varied in its height, pitch, tilt and lateral angle. Lateral angle determines the side shift. Further, that the side shift is not limited by a central mounting of the implement to the attachment. Even further, that the movement components of the attachment are protected while they have to support all of the weight of the implement or support all of the load when the implement is in use. Next, it is an object of the invention to have an adjustable lateral angle of the implement to the vehicle's direction of travel which can always be reset to a perpendicular position. Lastly, it is an objection of the present invention to provide a device capable of being mounted to an anchor post that is capable of all the other objections of this invention and is not jeopardized by lateral compression.

To accomplish the above objects of the invention the attachment defines two end points which are the mounting locations for the implement and vehicle to the attachment. Connected to these end points is an hydraulic ram which allows the distance between the end points to be moved over a range independent of any other attachments holding the implement to the vehicle. By mounting two pistons in parallel, maximum strength is available to support the implement. Two such piston driven attachments permit lateral shift to either side. Further strength is added by encasing each hydraulic ram in a casing which supports part of the weight or load as appropriate. These casings and their enclosed hydraulic rams are horizontally mounted.

Attached to each of these horizontal casings are vertical elevators, which can be other hydraulic rams, to raise the attachment and implement as desired.

A tilt arm is also attached to the implement with an hydraulic ram so the tilt of the implement can be varied.

The depth of the implement effects the amount of sideways extension.

BRIEF DESCRIPTION OF THE DRAWINGS

FIG. 1 is a perspective view of the present invention connecting an implement to a vehicle;

FIG. 2 is a top view of one embodiment of the present invention showing only how lateral angle or side shift is controlled;

FIG. 3 is a top view of another embodiment of the present invention to control lateral angle;

FIG. 4 is a close view of a slide mount used in the present invention;

FIG. 5 is a cross section of dotted line 5 shown in FIG. 4;

FIG. 6 is a detailed view of the exterior of casing 26.

FIG. 7 is a cross sectional view of FIG. 6;

FIG. 8 is another embodiment of the device shown in FIG. 7;

FIG. 9 is a state of the art mounting;

FIG. 10 is a comparison of the preferred embodiment to FIG. 9 unextended;

FIG. 11 is a comparison of the preferred embodiment to FIG. 9 extended; and

FIG. 12 is a side view to show vertical lift and pitch.

FIG. 14 is a cut away of an alternate embodiment of the present invention.

DESCRIPTION OF THE PREFERRED EMBODIMENT

Figure 13:
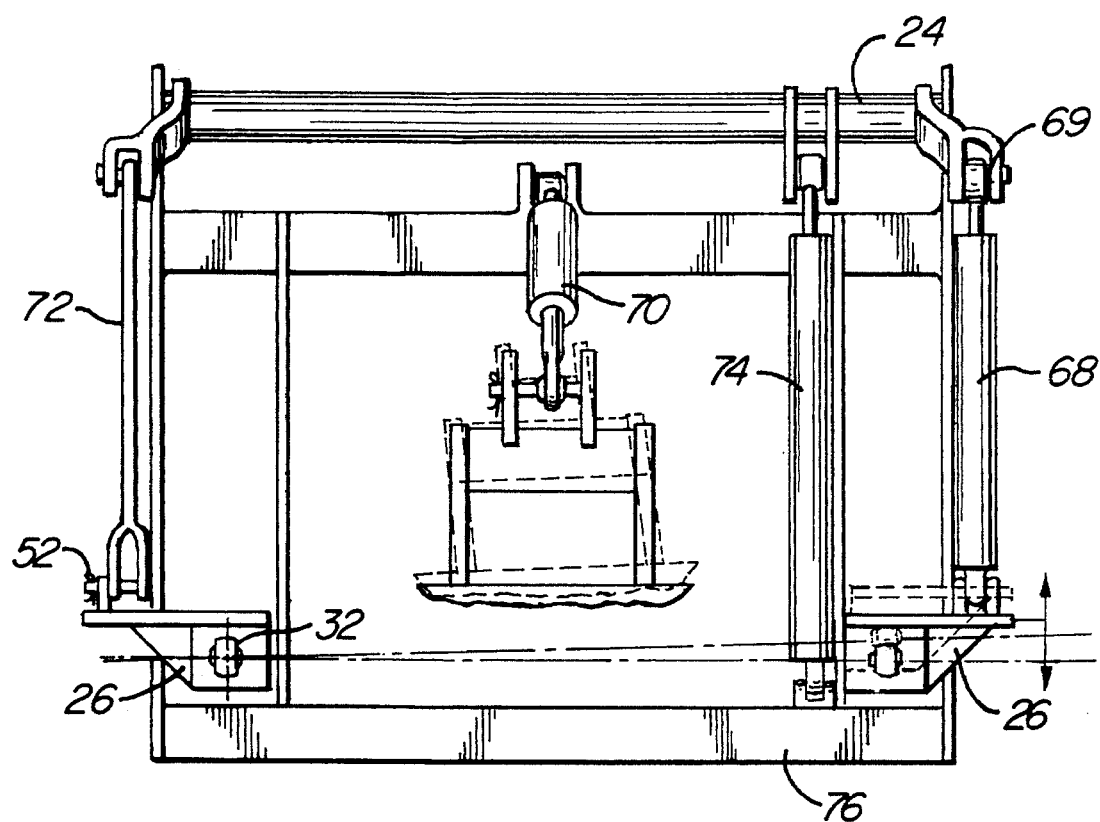
FIG. 13 is an alternate view of how to vary the tilt.

FIG. FIG. 1 is an overall side view of an implement 20, such as a box scrapper that can be used for hauling, plowing, grading, and so forth. Implement 20 is attached to a vehicle 22, such as a tractor. To allow implement 20 to be connected to vehicle 22, a mounting frame 24 is rigidly connected to vehicle 22. Such rigid connections are frequently made by welding although bolting or other means of fastening can be used.

Mounting frame 24 is a plurality of arms rigidly mounted to vehicle 22. The number of arms and orientation varies as the fastening points to any given vehicle 22 will vary as the design of vehicle 22 may vary. A blade 25 is shown on the far side of scrapper box 20 from vehicle 22.

FIG. 2 is a top view showing a casing 26 used to fasten one side of implement 20 to vehicle 22. FIG. 2 shows only the components needed to control lateral angle or side shift. Casing 26 is rigidly mounted to mounting frame 24. In FIG. 2 a rigid mount 28, such as a steel bar, provides support to the opposite side of implement 20. If casing 26 is the same length as rigid mount 28, the width of blade 25, denoted as "W" which can be the same width as implement 20 tracks a fixed path behind or in front of vehicle 22. Also with casing 26 and rigid mount 28 the same length, implement 20 is set perpendicular to vehicle 22's direction of travel. This lateral angle setting is one of the most common settings and the ability to always return to this angle of attack is guaranteed simply by matching the length of casing 267 to rigid mount 28. Back end or front end mounting to vehicle 22 is optional to the user and may differ based on the vehicle chosen.

If casing 26 is longer than rigid mount 28, implement 20 is twisted to the dotted line configuration with the effect that the edge of blade 25 is laterally or sideways shifted by an amount "S." As shown in FIG. 2 width W may be the same or less than the actual width of vehicle 22. In an equal length configuration, this means that if implement 20 has a width W, the same as vehicle 22's width then it will fit through any opening that permits vehicle 22 to pass through. For equal length mounting, the effective width of vehicle 22 is increased by the distance S when casing 26 is longer than rigid mount 28. The distance S is proportional to the difference in the mounting lengths and to depth "D" of implement 20.

FIG. 3 shows the same view as FIG. 2 except that rigid mount 28 has been replaced by a second casing 26. If either casing 26 is lengthened while the other remains as shown, then blade 25 can be shifted an amount S to either side. For the same lateral shift to either side, each casing 26 must have the same maximum length. Casings 26 have two defined end points 30 and 32. End point 30 is a rigid mount to mounting frame 24 although this can be a rigid mount that pivots. End point 32 is mounted so it can slide from side to side. While it is anticipated that for 9°, or perpendicular settings of implement 20, to be accomplished by contracting both casings 26 to their minimum length, it is also possible to have this same orientation farther from vehicle 22 by having each casing 26 extend the same distance. There will be occasions where desired usage will prefer to have implement 20 as far from vehicle 22 as possible. This technique can be used to extend implement 20 when a lateral shift is desired. However, the maximum value for S is when one casing 26 is fully extended and the other is fully compressed.

FIG. 4 is a close up view of the area indicated by dashed line 4 of FIG. 2. Casing 26 with end point 32 must allow for the fact that if casing 26 is to vary in length, there will be a twisting or shifting of end point 32's connection to implement 20. To permit this, two support bars 34 may be welded or otherwise attached to implement 20. Rigidly mounted between the two support bars 34 is a rod 36. Rod 36 passes through end point 32 as shown with end point 32 itself between the two support bars 34. Rod 36 is a slide bar to allow end point 32 to move or slide along rod 36 as implement 20 twists due to changes in length of casings 26. A single rod 36 may be used or as shown separate rods 36 can be used for each casing 26.

A ball swivel 38 may be used to cushion rod 36 so it can slide through end point 32. A spring 40 is placed around rod 36 and between end point 32 and support 34. Because there is a support bar 34 on each side of end point 32, two springs 40, one on each side, are required. Springs 40 cushion shifting as casing 26 changes length and help to avoid damage that results from contact between end point 32 and support bars 34. Springs 40 also help to realign implement 20 as casing 26 changes length.

FIG. 5 is a cross sectional view of dotted line 5 in FIG. 4. This is a cross sectional view of end point 32. Ball swivel 38 may be made of steel and may be one piece or it can have an inner filler 42 such as silicon based rubber to facilitate sliding of rod 36 through end point 32. Rod 36 is shown cylindrically shaped so that in addition to sliding along rod 36, end point 32 may rotate about rod 36 as will be described further on. A cushion 44 such as a washer of steel may be used to help limit wear between springs 40 and ball swivel 38.

FIG. 6 is a view of the exterior of casing 26. End point 30 may have a pivot mount 46 such that while end point 30 does not slide back and forth, casing 26 may pivot around end point 30. Casing 26 has an exterior shell 48 which can be metal such as steel to provide a covering which can also be load bearing. A side load wear block 50 can be attached to shell 48 to limit twisting of casing 26. Side load wear block 50 is placed to keep unwanted lateral shifting of casing 26. Mounted on the top of shell 48 is vertical attachment point 52. One form of mounting both side wear block 50 and vertical attachment point 52 to shell 48 is by welding them in place.

FIG. 7 is a cross sectional view of FIG. 6. In both FIG. 6 and FIG. 7, an extension range, "R," is shown for casing 26. End point 32 is varied over range R by a hydraulic ram 54. To allow this range R, casing 26 with shell 48 has an inner sleeve 56 which fits within shell 48. Sleeve 56 may also be thought of as an inner shell. A square configuration is shown, but any other shape will work as long as the exterior of sleeve 56 fits within the interior surface of shell 48. Hydraulic lines 58 attached to a reservoir not shown via connectors 59 are pressurized by standard hydraulic equipment, also not shown. Hydraulic ram 54, which is a piston device, is mounted within shell 48 to shell 48 by attachment 60, such as a screw, to a cross member 61 which is both a cross bar within shell 48 and a stop for sleeve 56. At the other end of hydraulic ram 54, it is mounted to sleeve 56 at attachment point 62 which can be a screw or other known form of attachment for a hydraulic ram. Attachment 62 is rigidly mounted to a cross bar 63 within sleeve 56. Sleeve 56 is rigidly mounted via cross bar 63 to end point 32. Both cross member 61 and cross bar 63 may be made part of the structure of shell 48 and sleeve 56 as shown. As hydraulic ram 54 extends, end point 32 extends as sleeve 56 extends from shell 48. The mounting of hydraulic ram 54 allows some of the weight and load to be borne by shell 48 and sleeve 56. Shell 48 and sleeve 56 also protect hydraulic ram 54 from damage, such as collision with vehicles, rocks, and so forth.

FIG. 8 is the same as FIG. 7 except an absorption spring 64 is mounted between attachment 60 and sleeve 56. Absorption spring 64 is around hydraulic ram 54. Absorption spring 64 helps assure a smooth transition as the ram changes length and helps absorb any blows that a blade might transmit through the apparatus if it hit a rock or other rigid object. There are commercially available hydraulic fluid dampers which can be used to accomplish this same purpose.

FIG. 9 is a view of a state of the art rigid mounting such as rigid mount 28 referred to earlier in FIG. 2. However, state of the art would have at least one such mounting centrally placed to support implement 20. Rigid mount 28 has two pivot mountings 29a and 29b. A solid metal bar 66 has pivot mount 29a to connect it to mounting frame 24. By pulling up at vertical attachment point 52, rigid mount 28 pivots around frame 24 at pivot mount 29a. This permits the height of implement 20 to be varied as desired.

FIG. 10 and FIG. 11 show the comparison to FIG. 9 for the preferred embodiment. FIG. 10 is for the unextended position and FIG. 11 is for the extended position. Side load wear block 50 is also shown in contact with mounting frame 24. The only contact between these two is due to abutting. Side load wear block 50 is physically connected to casing 26.

FIG. 12 is a side view showing a vertical hydraulic ram 68 pivotally mounted between mounting frame 24 and vertical attachment point 52 on casing 26. As vertical hydraulic ram 68 raises casing 26 to the dotted position the need for a pivot mounting in end point 32 is clearly shown. A pivot mount 69 is also needed for the upper connection of vertical hydraulic ram 68 to mounting frame 24. Since there are two casings 26 there are two vertical hydraulic rams 68 which must operate in tandem as a vertical elevator of implement 20. Similarly a variable tilt arm 70, such as another hydraulic ram, is pivotally mounted between mounting frame 24 and the top of implement 20. As variable tilt arm 70 changes length, the pitch of implement 20 may be rotated about end points 32.

While it cannot be seen from FIG. 12, FIG. 12 also contains one method to change the tilt of implement 20. From side to side, the tilt means that the side of implement 20 closest to the observer may be higher or lower than the side farthest from the observer. If both vertical hydraulic rams operate in tandem, then height of implement 20 is controlled. If vertical hydraulic rams operate independently then one side of implement 20 may be higher than the other. This varies the tilt.

FIG. 13 shows an alternate way to vary the height and tilt. FIG. 13 is a view looking into the present invention from implement 20. Instead of two vertical hydraulic rams 68, only one is used. Replacing the second one is a rigid bar 72, such as steel. As the length of vertical hydraulic ram 68 varies it can be shorter than rigid bar 72, the same length, or longer. This will result in only a change of tilt. That is the right side, as shown in FIG. 13, will move up and down as the length of vertical hydraulic ram 68 varies. For this variation to change the height of implement 20, a lift ram 74 is connected between mounting ram 24 and a left bar 76 which is a rigid attachment to implement 20 capable of supporting the weight of implement 20. As lift ram 74 contracts while vertical hydraulic ram 68 is fixed, implement 20 is lifted as a unit. For this lift vertical hydraulic ram 68 and rigid bar 72 pivot at pivot points 69 and vertical attachment points 52. The related hydraulic lines, couplings, reservoir tank, pump, and so forth have not been shown because they are common knowledge to those skilled in the art.

FIG. 14 is an alternate embodiment of the present invention. In FIG. 1, it was assumed that mounting frame 24 would have easy access to be bolted or welded to the frame of vehicle 22. However, for some vehicles, such as certain types of tractors, the only mounting space available is to the back end of the tractor via an anchor post 122. Extension bars 80, which can be welded or bolted to anchor post 122, provided a lateral shift to mount casings 126 so they may still be attached at the same positions to implement 20. Extension bars 80 place two mounting points 81 a fixed distance apart. Each mounting point 81 is a pivot mount. To provide support, two rigid braces 82 form an X between casing 126 to keep them aligned. Rigid braces 82 may be turn buckles as shown, chains, or any other known lateral support. Chains are not preferred because while rigid support is provided if casings 126 seek to diverge, chains are of no support if the distance between casing 126 is compressed. Variable tilt arm 70 is attached by pivot mount 124 to the top of anchor post 122. Vertical support 128 is also mounted to anchor post 122 to provide vertical lifting of casing 126 as previously taught. Spacers 130, allow vertical hydraulic rams 68 to be placed in line with casings 126 so they pivot casings 126 about mounting points 81 as casings 126 are raised or lowered. Again, if vertical hydraulic raisers 68 do not work in tandem then tilt can be varied.

What is claimed is:

1. A variable implement orientation device for attachment of an implement to a vehicle comprising:

A. a mounting frame;

B. at least two casings attached between said mounting frame and said implement and placed such that when the casings are the same length said implement is perpendicular to said vehicle;

C. a plurality of attachment points mounted to one of said casings, at least one of said attachment points defining a first end point of said same casing where it is attached to said mounting frame and defining a second end point where said same casing attaches to said implement;

D. two vertical hydraulic rams, one each operably mounted between said mounting frame and each of said casings for varying the height distance between said casing and said mounting frame where said vertical hydraulic rams are connected to said casing and to said mounting frame;

E. a variable tilt arm connected between said mounting frame and said implement for changing the pitch of said implement about the attachment between said casings and said implement;

F. a hydraulic ram mounted within each of said casings and connected to said two attachment points defining the ends of said casing for varying the distance between said two end points;

G. pivot connectors mounted in each of said end points of each casing;

H. at least one slide bar mounted to said implement and passing through said pivot connectors in the end point of each of said casings closest to said implement such that said pivot connectors may slide along said slide bar; and I. two springs one each side of the end point of each casing which has said slide bar mounted for sliding through said end point, said springs further mounted around said slide bar for cushioning said end points as it slides along said slide bar.

2. In a variable implement orientation device as claimed in claim 1 where said variable tilt arm comprises a hydraulic ram.

3. A variable implement orientation device as claimed in claim 1 further comprising a side load wear block rigidly mounted on each of said casings to prevent undesired bending of said casing.

4. A variable implement orientation device as claimed in claim 1 where said hydraulic ram mounted within each of said casings for varying the distance between said two end points comprises a piston.

5. A variable implement orientation device as claimed in claim 4 further comprising an absorption spring within each of said casings operably mounted around said pistons within each of said casings.

6. A variable implement orientation device as claimed in claim 1 where said pivot connector further comprises a ball swivel.

7. A variable implement orientation device for attachment of an implement to a vehicle with an anchor post comprising:

A. extension bars mounted to said anchor post for placing two mounting points a predetermined distance apart;

B. two casings, one attached to each of said mounting points and placed such that when the casings are the same length said implement is perpendicular to said vehicle;

C. two turn buckles, forming an X, mounted between said two casings for aligning said casings each with respect to the other;

D. a vertical support mounted on said anchor post;

E. two vertical hydraulic rams, one each operably connected between one of said casings and said vertical support;

F. a variable tilt arm connected between said anchor post and said implement for changing the pitch of said implement;

G. a hydraulic ram mounted within each of said casings and connected such that each casing length may vary the distance between said implement and said mounting point where said casing is attached;

H. pivot connectors mounted in each end of each of said casings; and

I. at least one slide bar mounted to said implement and passing through said pivot connectors in the end points of said casings closest to said implement such that said pivot connectors may slide along said slide bar.

8. A variable implement orientation device as claimed in claim 7 further comprising an absorption spring within each of said casings operably mounted around said hydraulic ram within each of said casings.

9. A variable implement orientation device for attachment of an implement to a vehicle comprising:

A. A mounting frame;

B. two casings, a first and a second, attached between said mounting frame and said implement and placed such that when the casings are the same length said implement is perpendicular to said vehicle;

C. a plurality of attachment points mounted to said casing, at least two of said attachment points defining end points of said casings;

D. a rigid vertical support of predetermined length connected between said mounting frame and said first casings;

E. a vertical hydraulic ram operably mounted between said mounting frame and said second casing;

F. a left ram operably connected between said mounting frame and said implement;

G. a variable tilt arm connected between said mounting frame and said implement for changing the pitch of said implement about the attachment between said casings and said implement;

H. a hydraulic ram mounted within each of said casings and connected to said two attachment points defining the ends of said casing for varying the distance between said two end points;

I. pivot connectors mounted in each of said end points of each casing;

J. two slide bars mounted to said implement and passing through a ball swivel within said pivot connector closest to said implement such that said pivot connector with said ball swivel may move along said slide bar; and K. two springs mounted around each of said slide bars, one on each side of said ball swivels, said springs further mounted around said slide bar for cushioning said end pivot as it slides along said slide bar.

10. A variable implement orientation device as claimed in claim 11 further comprising an absorption spring within each of said casings operably mounted around said hydraulic ram within each of said casings.

11. A variable implement orientation device for attachment of an implement to a vehicle comprising:

A. A mounting frame;

B. a rigid horizontal support of predetermined length connected between said mounting frame and said implement;

C. a casing connected between said mounting frame and said implement;

D. two attachment points mounted to said casing so as to define two end points of said casing where it is attached to said mounting frame and to said implement;

E. first and second vertical hydraulic rams, said first vertical hydraulic ram connected between said mounting frame and said rigid horizontal support and said second vertical hydraulic ram connected between said mounting frame and said casing;

F. a variable tilt arm connected between said mounting frame and said implement for changing the pitch of said implement about the attachment between said casings and said implement;

G. a hydraulic ram mounted within said casing and connected to said two attachment points defining the ends of said casing for varying the distance between said two end points;

H. four pivot connectors, the first and second attached to said rigid horizontal support, one each where said rigid horizontal support fastens to said mounting frame and one where said rigid horizontal support connects to said implement, the third and fourth attached to said casing one at each of said casing end points for fastening to said mounting frame and to said implement;

I. two slide bars mounted to said implement, one passing through said pivot connector where said rigid horizontal support is attached to said implement and the second passing through said pivot connector where said casing is attached to said implement; and J. two springs mounted around each of said slide bars, one on each side of said pivot connectors, said springs further mounted around said slide bar for cushioning said end pivot as it slides along said slide bar.

* * * * *